Feb. 17, 1953 C. F. SPEICHER ET AL 2,628,730
LOADING ATTACHMENT FOR TRACTORS
Filed Sept. 12, 1949 3 Sheets-Sheet 1
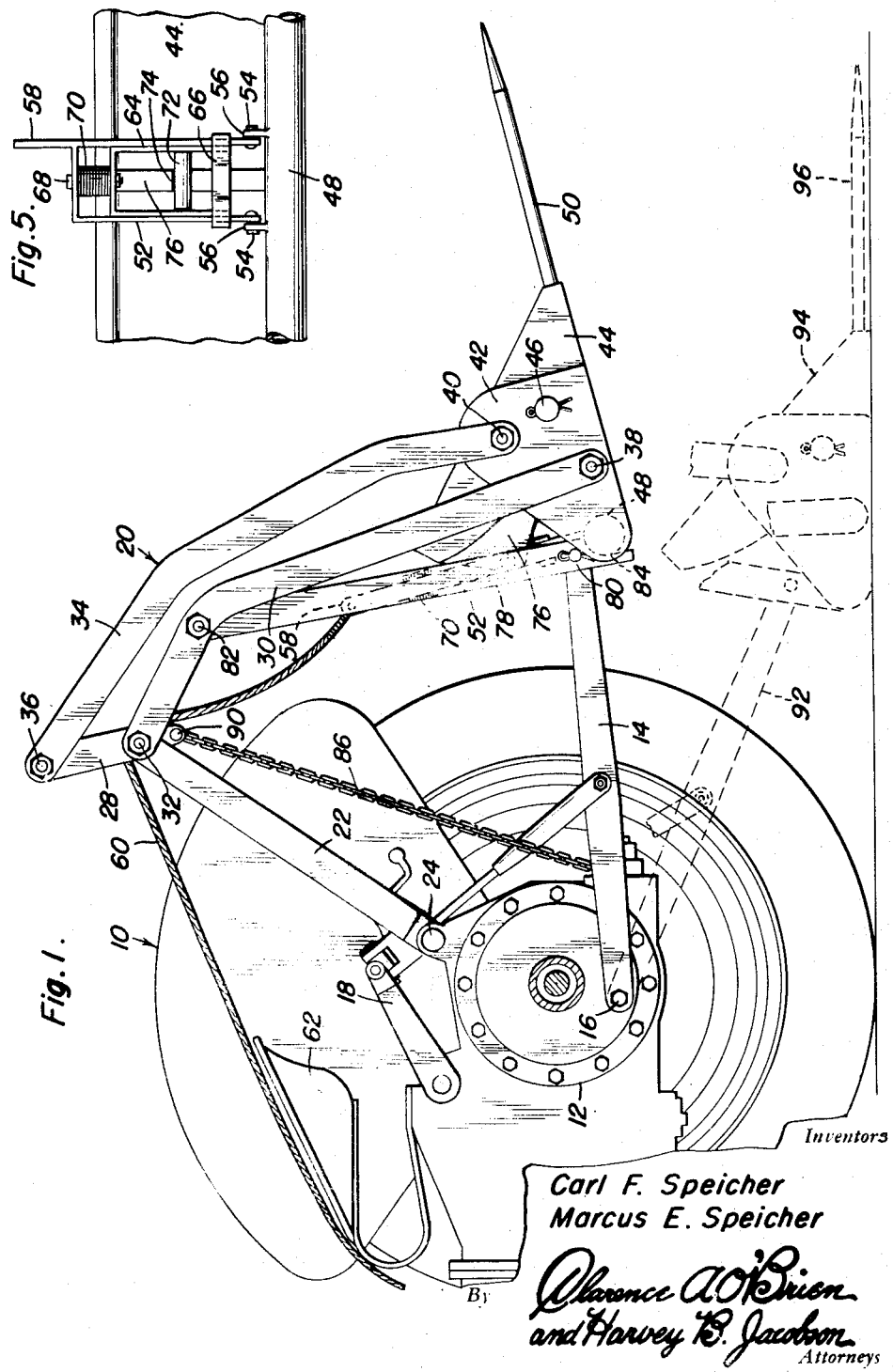
Inventors
Carl F. Speicher
Marcus E. Speicher

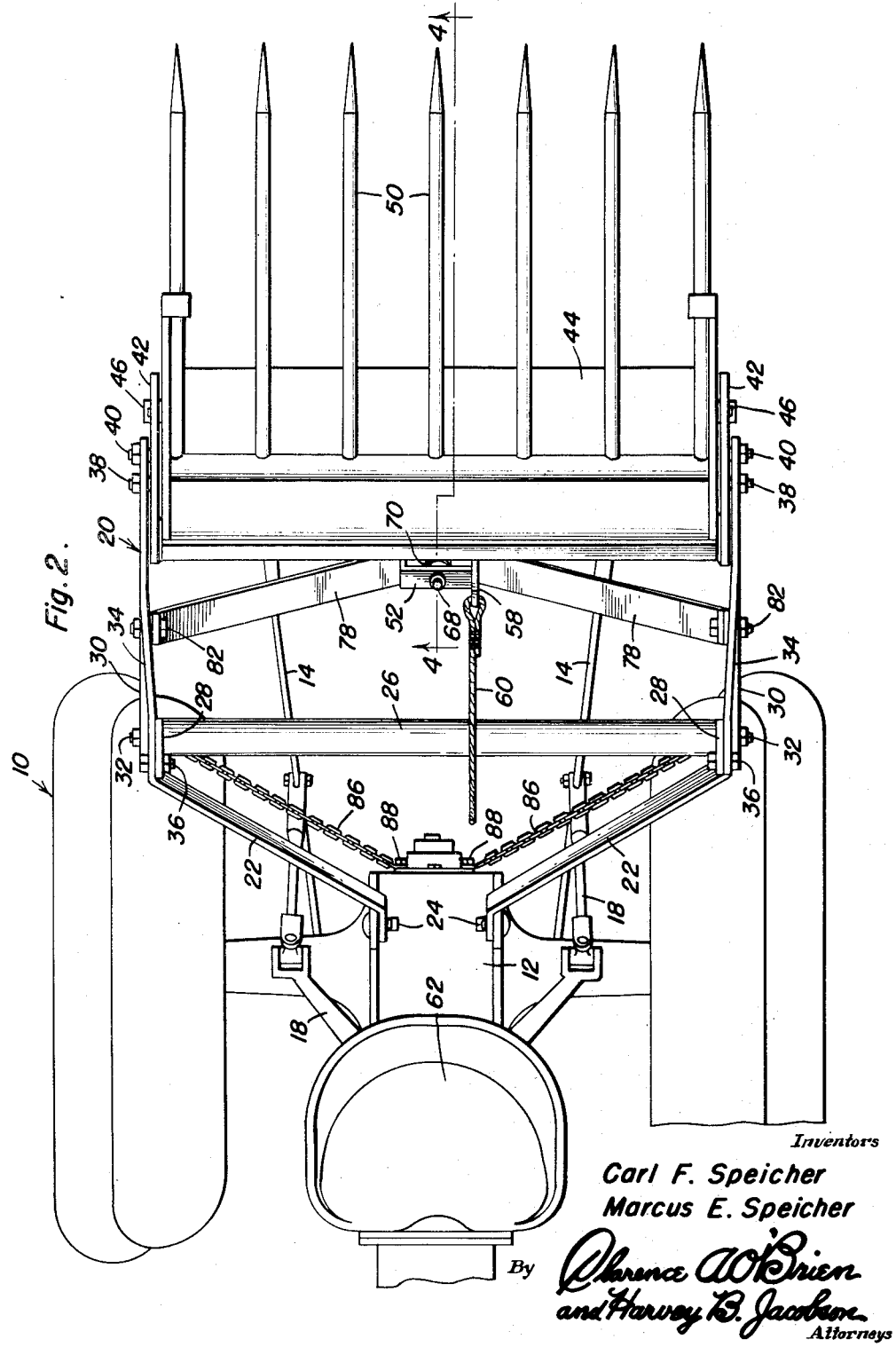

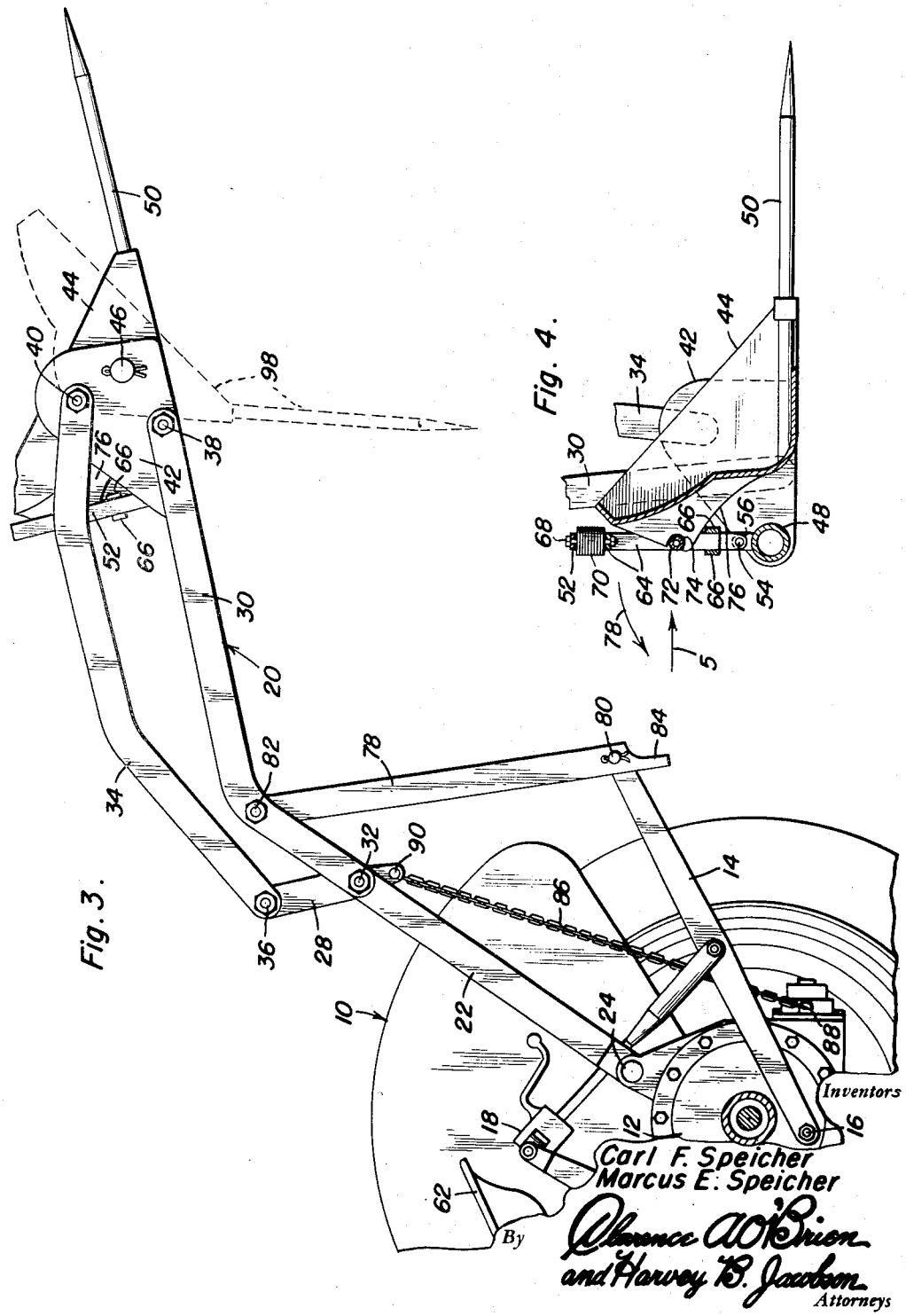

UNITED STATES PATENT OFFICE 2,628,730

LOADING ATTACHMENT FOR TRACTORS

Carl F. Speicher and Marcus E. Speicher, Celina, Ohio, assignors to Celina Farm Tools, Inc., Celina, Ohio, a corporation of Ohio Application September 12, 1949, Serial No. 115,148

5 Claims. (Cl. 214—140)

This invention relates to new and useful improvements and structural refinements for attachments for tractors, and the principal object of the invention is to provide an attachment of the character herein described, such as may be conveniently and effectively employed in combination with a tractor for loosening material on the ground and elevating the same to a sufficient height for loading purposes.

In particular, the invention is adapted for use on Ford, Ferguson, or Ford-Ferguson tractors equipped with a hydraulic lift mechanism, an important feature of the invention residing in the structural arrangement which permits the attachment to loosen the material on the ground and still have sufficient power for elevating the same to a loading height, notwithstanding the limited amount of power which is available in the hydraulic lifting system of a light-weight tractor.

Some of the advantages of the invention reside in its simplicity of construction, in its convenient, expeditious and dependable operation, and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 1 is a side elevational view of the invention in situ on a tractor, one rear wheel of the tractor being removed for clarity, the invention being shown in a partially raised position by solid lines and in a lowered position by phantom lines;

Figure 2 is a top plan view of the subject shown in Figure 1;

Figure 3 is a side elevational view, similar to that shown in Figure 1, but illustrating the invention in its fully raised position;

Figure 4 is a cross-sectional view, taken substantially in the plane of the line 4—4 in Figure 2; and Figure 5 is a fragmentary elevational view, taken in the direction of the arrow 5 in Figure 4.

Like characters of reference are employed to designate like parts in the specification and throughout the several views.

Referring now to the accompanying drawings in detail, the general reference character 10 designates a tractor including a rear axle housing 12 provided with a pair of rearwardly projecting lift arms or hitch links 14 which are pivoted to the housing, as at 16, and are adapted to be raised and lowered by hydraulically actuated linkage 18 of a conventional type.

The invention resides in the provision of a loading attachment designated generally by the reference character 20 and embodying in its construction a pair of transversely spaced links 22 which are pivoted at one end thereof, as at 24, to the tractor housing 12, while their remaining ends are rigidly secured together by a cross-bar 26, thus forming a unitary rigid linkage structure. Cross-bar 26, in turn, is provided with a pair of rigid cranks 28 so that these cranks, in effect, are swingable upwardly and downwardly with the links 22 and constitute continuations 18 or extensions of the latter, and the links 22, the cross-bar 26, and the cranks 28 define a functionally unitary, bell-crank type lever structure.

A pair of transversely spaced carrier links 30, configurated as shown in Figures 1 and 3, are pivoted at one end, as indicated at 32, to the links 22 at the point of attachment of the latter to the cross-bar 26, while a pair of transversely spaced guiding links 34 are pivoted at one end to the cranks 28, as indicated at 36.

The remaining ends of the links 30, 34 are pivoted at mutually spaced points, as at 38, 40, respectively, to a pair of end pieces 42 between which is pivotally mounted an elongated load receptacle or bucket 44, the cross-sectional configuration of the latter being shown in Figure 4.

The pivotal attachment of the receptacle 44 to the end pieces 42 is achieved by providing a pair of projecting trunnions 46 on the receptacle, it also being noted that the end pieces 42 are rigidly secured together by a transversely extending frame member 48. (See Figure 4.)

The bottom wall of the receptacle 44 is preferably provided with a set of spaced parallel prongs or tines 50, and in addition, means are provided for supporting the receptacle 44 in a substantially horizontal position relative to the end pieces 42, as will be presently described.

These means consist of an inverted, substantially U-shaped bracket or latch frame 52 which is pivoted, as at 54, to a pair of ears 56 provided on an intermediate portion of the cross member 48, one side portion of this bracket being extended as at 58 and having connected thereto a flexible element such as a cable or rope 60 passing over the aforementioned bar 26 toward the operator's seat 62 of the tractor 10.

A second, inverted and substantially U-shaped bracket or keeper frame 64 is provided at its free end portion with a pair of transversely extending straps 66 and is slidable longitudinally within the bracket 52, but is adjustably secured thereto by a suitable bolt or screw 68 provided with spacing washers 70, whereby the relative positioning of the two brackets may be adjusted, as will be hereinafter more fully described.

A transverse keeper roller 72 is mounted between the side pieces of the bracket 64 and is receivable by a latching surface comprising a notch 74 provided in the edge portion of a web or fin 76 with which the receptacle 44 is equipped, so that as long as the roller 72 is disposed in the notch 74, pivotal movement of the receptacle about the trunnions 46 is not possible. However, when the brackets 52, 64 are swung away from the receptacle, as indicated at 78, the receptacle may be subjected to upward and downward tilting movement.

A pair of transversely spaced coupling bars 78 are pivotally attached, as at 80, to the free end portions of the lift arms 14 and are also pivoted, as at 82, to intermediate portions of the carrier links 30. By virtue of these bars, the levers 22 are swung upwardly and downwardly in unison with the lift arms 14. It is to be also noted that the lower end portions of the bars 78 are provided with recesses or notches 84 so that they may supportably engage the cross member 48.

Finally, it is to be noted that a pair of flexible elements in the form of chains 86 of predetermined length are anchored to the rear axle housing 12, as at 88, while the remaining ends of the chains are connected, as at 90, to the cross-bar 26.

Having thus described the construction of the invention, the operation thereof will now be explained.

Assuming the lift arms 14 to be in their lowered positions, as indicated at 92 in Figure 1, the receptacle 44 as well as the tines 50 thereof are disposed on the ground in a flat lying position, as indicated at 94, 96, respectively, in which position the cross member 48 is supportably engaged by the notched portions 84 of the coupling bars 78, while the receptacle 44 is prevented from swinging about the horizontal axis of its trunnions 46 by the locking means 72, 74, etc. Under such circumstances, the tractor 10 may be driven rearwardly so that the tines 50 penetrate into the bottom portion of a load which is to be lifted, after which the hydraulically controlled linkage 18 of the tractor is actuated so as to raise the arms 14 to the position shown by the solid lines in Figure 1. It will be apparent that the arrangement of the linkage of the attachment is such that during this initial raising operation the receptacle 44, together with the tines 50 will be swung or tilted upwardly as well as raised, so that the material or load is loosened from the ground. Also, if the receptacle 44 is forced into the load and the tractor 10 then moved forwardly, the described linkage produces an upward tilting of the receptacle 44 and tines 50. Hence, the tractive effort of tractor 10 may be used to supplement the lifting effort of the hydraulically lifted hitch links 14 to effect the initial break away of the load. During this initial stage of the loading operation, the chains 86 are slack, and the whole structure raises about pivot 24, but when the receptacle 44 is lifted sufficiently so that the chains become taut, further upward movement of the links 22 will be prevented and, as a result, further raising movement takes place about pivot 32 and the receptacle 42 will be raised upwardly while being disposed in an upwardly tilted position, as shown in Figure 1, until a fully elevated position is reached, as shown in Figure 3. Hence, a maximum leverage arm is employed to initially break away and raise the load and a minimum leverage arm is employed to complete the lifting. Thus, the described loader structure provides increased break away power without sacrificing the maximum height obtainable by the load receptacle.

This fully elevated position of the receptacle is arranged so as to be sufficient to facilitate dumping of the load, the dumping operation being effected by simply pulling the cable or rope 60 so that the brackets 52, 64 are swung as shown at 76 and the roller 72 is disengaged from the notch 74, thus permitting the receptacle 44 to swing downwardly about the axis of the trunnions 46 to a discharging position indicated at 98 in Figure 3.

Needless to say, the attachment may be lowered to the ground by simply reversing the procedure above outlined, so that the device is in readiness for the next loosening and loading operation.

Finally, it should be explained that the purpose of the spacers 70 on the bolt 68 is to adjust the relationship of the receptacle 44 with respect to the end plates 42 during the initial stages of the loading operation, thus assuring that the receptacle is substantially horizontal when it rests on the ground.

It is believed that the advantages and use of the invention will be clearly apparent from the foregoing disclosures and, accordingly, further description thereof at this point is deemed unnecessary.

Having described the invention, what is claimed as new is:

1. For use with a tractor having a rearwardly projecting lift arm and means for raising and lowering the same, a loading attachment comprising a rigid lever structure adapted to be pivoted to said tractor above said lift arm and swingable in a vertical plane, a carrier lever pivoted to said lever structure, a coupling bar for pivotally connecting said arm to a medial portion of said carrier lever, a load receptacle pivoted to said carrier lever, and a guiding link pivotally connected to said receptacle in spaced relation to the connection of said receptacle with said carrier lever and connected to said lever structure in spaced relation to the connection of said carrier lever thereto, whereby the receptacle may be lifted from a ground-engaging to an elevated position with said guiding link preventing free movement of said receptacle about its point of attachment to said carrier lever.

2. The device as defined in claim 1 together with means for restricting upward movement of said lever structure when said lift arm is in a partly raised position, whereby the receptacle may be further elevated about the pivotal connection of said carrier lever and said lever structure upon further lifting of said arm.

3. For use with a tractor having a rearwardly projecting lift arm and means for raising and lowering the same, a loading attachment comprising a lever structure adapted to be pivoted at one end thereof to said tractor above said lift arm and swingable in a vertical plane, a vertically swingable carrier lever pivoted at one end thereof to an intermediate portion of said lever structure, a coupling bar for pivotally connecting the free end of said lift arm to an intermediate portion of said carrier lever, a load receptacle pivotally mounted at the free end of the carrier lever and tiltable about a horizontal axis, a guiding link pivoted to the free end of said lever structure and to said receptacle in spaced relation to the pivotal mounting of said receptacle to said carrier lever, and a flexible element of a predetermined length extending between the tractor and said lever structure, whereby said receptacle may be lifted from a horizontal ground-engaging position to a tilted partly-raised position and thereafter elevated to a fully raised position without substantial additional tilting of said receptacle.

4. The device as defined in claim 3 together with means for locking said receptacle in its tilted position against downward tilting movement.

5. For use with a tractor having a pair of transversely spaced, power-liftable trailing hitch links pivotal about an axis located on the tractor, a rear end material handling device comprising a rigid member adapted to be pivoted to the tractor on a horizontal axis disposed above the corresponding axis of said hitch links, a pair of levers pivoted adjacent the free end of said member for movement in a vertical plane relative to said member, a load receptacle carried by said levers, a pair of coupling bars for respectively pivotally interconnecting said hitch links and said levers, and fixed length, flexible stop means connected between the tractor and said member to limit the upward swinging movement of said member, whereby said load receptacle and said member are simultaneously raised initially about said horizontal axis of said hitch links and the rigid member pivot axis, respectively, and the load receptacle is raised subsequently about the pivotal connection axis of said member and said levers.

CARL F. SPEICHER.
MARCUS E. SPEICHER.

REFERENCES CITED

The following references are of record in the file of this patent:

UNITED STATES PATENTS

| Number | Name | Date |
|---|---|---|
| 2,352,466 | Arps | June 27, 1944 |
| 2,429,717 | Gordon | Oct. 28, 1947 |
| 2,441,070 | Hoover | May 4, 1948 |
| 2,449,212 | Fraga | Sept. 14, 1948 |
| 2,472,194 | Cook | June 7, 1949 |
| 2,501,231 | Mefferd | Mar. 21, 1950 |